US008248935B2

(12) United States Patent
Rößler

(10) Patent No.: US 8,248,935 B2
(45) Date of Patent: Aug. 21, 2012

(54) METHOD FOR SELECTING A CODEC AS A FUNCTION OF THE NETWORK CAPACITY

(75) Inventor: Georg Rößler, Oberursel (DE)

(73) Assignee: Avaya GmbH & Co. KG (DE)

( * ) Notice: Subject to any disclaimer, the term of this patent is extended or adjusted under 35 U.S.C. 154(b) by 1163 days.

(21) Appl. No.: 11/460,022

(22) Filed: Jul. 26, 2006

(65) Prior Publication Data
US 2007/0165644 A1    Jul. 19, 2007

(30) Foreign Application Priority Data
Aug. 5, 2005   (DE) .................. 10 2005 037 586

(51) Int. Cl.
*H04L 12/26* (2006.01)
*H04J 3/22* (2006.01)
*G06F 15/16* (2006.01)

(52) U.S. Cl. ......... 370/232; 370/486; 709/228; 709/247

(58) Field of Classification Search ...................... None
See application file for complete search history.

(56) References Cited

U.S. PATENT DOCUMENTS

| 6,252,854 | B1 * | 6/2001 | Hortensius et al. ............ 370/252 |
| 6,349,094 | B1 * | 2/2002 | Vastano et al. ................ 370/328 |
| 6,373,839 | B1 * | 4/2002 | Clark et al. .................... 370/352 |
| 6,603,774 | B1 * | 8/2003 | Knappe et al. ................. 370/466 |
| 6,618,699 | B1 * | 9/2003 | Lee et al. ........................ 704/209 |
| 6,754,232 | B1 * | 6/2004 | Tasker ........................... 370/477 |
| 6,798,786 | B1 * | 9/2004 | Lo et al. ......................... 370/468 |
| 7,092,844 | B1 * | 8/2006 | Young et al. ................... 702/181 |
| 7,260,060 | B1 * | 8/2007 | Abaye et al. ................... 370/230 |
| 7,512,118 | B1 * | 3/2009 | Stephens ........................ 370/352 |
| 7,583,658 | B1 * | 9/2009 | Wang et al. .................... 370/352 |
| 7,586,891 | B1 * | 9/2009 | Masciulli ....................... 370/344 |
| 7,606,909 | B1 * | 10/2009 | Ely et al. ........................ 709/227 |
| 7,627,629 | B1 * | 12/2009 | Wu et al. ........................ 709/204 |
| 7,643,414 | B1 * | 1/2010 | Minhazuddin ................ 370/230 |
| 7,864,678 | B1 * | 1/2011 | Sampath et al. .............. 370/232 |
| 2003/0016630 | A1 * | 1/2003 | Vega-Garcia et al. ........ 370/252 |
| 2003/0158968 | A1 * | 8/2003 | Huart et al. .................... 709/245 |
| 2004/0001501 | A1 * | 1/2004 | Delveaux et al. ............. 370/442 |

(Continued)

FOREIGN PATENT DOCUMENTS
DE     102005036298    12/2006

(Continued)

OTHER PUBLICATIONS

Handley et al.; "SDP: Session Description Protocol"; Handley & Jacobson RFC 2327, Standards Track, Apr. 1988; 35 pages.

(Continued)

*Primary Examiner* — Timothy J Weidner
(74) *Attorney, Agent, or Firm* — Sheridan Ross P.C.

(57) ABSTRACT

The invention relates to a method for selecting a codec for transmission of audio and/or video data between terminals (1, 3) through a packet switching connection (2), the terminals (1, 3) selecting the codec from a codec list, characterized in that the codec list for a new connection is determined by means of a table in which for at least one destination address range, the associated transmission capacity is indicated and the table is automatically updated through measurements, as well as a terminal for carrying out the method.

20 Claims, 1 Drawing Sheet

| Address range | Transmission capacity (kb/s) | Confidence Interval (kb/s) | Time of measurement (sec. in epoch) | Codec list G.xxx |
|---|---|---|---|---|
| 10.0.0.0/8 | 879.2 | 439.7 | 1080753746 | 726, 711, 729 |
| 10.243.176.0/20 | 92719.3 | 11734.3 | 1080748107 | 711, 726 |
| 192.168.67.0/24 | 109.7 | 26.4 | 1080760144 | 729, 726 |
| 0.0.0.0/0 | 10000.0 | 0.0 | (default) | 711, 726, 729 |

U.S. PATENT DOCUMENTS

| | | | |
|---|---|---|---|
| 2005/0021384 A1* | 1/2005 | Pantaleo et al. | 705/9 |
| 2005/0055203 A1* | 3/2005 | Makinen et al. | 704/229 |
| 2005/0083922 A1* | 4/2005 | Takai et al. | 370/386 |
| 2005/0185674 A1* | 8/2005 | Ramsey et al. | 370/468 |
| 2005/0201414 A1* | 9/2005 | Awais | 370/468 |
| 2006/0159124 A1* | 7/2006 | Henry et al. | 370/468 |
| 2006/0168323 A1* | 7/2006 | Kim et al. | 709/238 |
| 2006/0174015 A1* | 8/2006 | Arauz-Rosado | 709/228 |
| 2006/0224381 A1* | 10/2006 | Makinen | 704/223 |
| 2006/0280162 A1* | 12/2006 | Zhao et al. | 370/352 |
| 2007/0140116 A1* | 6/2007 | Vega-Garcia | 370/230 |
| 2007/0281681 A1* | 12/2007 | Holm | 455/422.1 |
| 2009/0040925 A1* | 2/2009 | Holmstrom et al. | 370/230 |
| 2009/0059818 A1* | 3/2009 | Pickett | 370/259 |
| 2009/0103530 A1* | 4/2009 | Fartmann et al. | 370/389 |
| 2009/0245260 A1* | 10/2009 | Mohaban et al. | 370/392 |

FOREIGN PATENT DOCUMENTS

| | | |
|---|---|---|
| EP | 1107538 | 6/2001 |
| JP | 2002-359651 | 12/2002 |
| WO | WO 2005/003884 | 1/2005 |

OTHER PUBLICATIONS

Prasad et al.; "Bandwidth Estimation: Metrics, Measurement Techniques, and Tools"; IEEE Network, Nov./Dec. 2003; pp. 27-35.

Nilsson; "Recommendation H.245—Version 9"; International Telecommunication Union, Telecommunication Standardization Sector, Study Period 2000-2004; 53 pages.

* cited by examiner

| Address range | Transmission capacity (kb/s) | Confidence interval (kb/s) | Time of measurement (sec. in epoch) | Codec list G.xxx |
|---|---|---|---|---|
| 10.0.0.0/8 | 879.2 | 439.7 | 1080753746 | 726, 711, 729 |
| 10.243.176.0/20 | 92719.3 | 11734.3 | 1080748107 | 711, 726 |
| 192.168.67.0/24 | 109.7 | 26.4 | 1080760144 | 729, 726 |
| 0.0.0.0/0 | 10000.0 | 0.0 | (default) | 711, 726, 729 |

| Address range | Transmission capacity (kb/s) | Confidence interval (kb/s) | Time of measurement (sec. in epoch) |
|---|---|---|---|
| 10.0.0.0/8 | 879.2 | 439.7 | 1080753746 |
| 10.243.176.0/20 | 92719.3 | 11734.3 | 1080748107 |
| 192.168.67.0/24 | 109.7 | 26.4 | 1080760144 |
| 0.0.0.0/0 | 10000.0 | 0.0 | (default) |

| Capacity range (kb/s) | Codec list G.xxx |
|---|---|
| 0-500 | 729, 726 |
| 500-2000 | 726, 711, 729 |
| 2000-15000 | 711, 726, 729 |
| 15000- | 711, 726 |

| Limit capacity (kb/s) | Codec G.xxx |
|---|---|
| 0 | 729 |
| 1000 | 726 |
| 5000 | 711 |

METHOD FOR SELECTING A CODEC AS A FUNCTION OF THE NETWORK CAPACITY

BACKGROUND

The present invention relates to a method for selecting a codec for transmission of audio and/or video data between terminals through a packet switching connection, the terminals selecting the codec from a codec list, as well as a terminal for carrying out the method.

For transmitting audio and/or video data flows via packet-oriented transport protocols, such as, for example, IP (Internet protocol), a number of coding methods in the form of codecs is available. The latter differ regarding data rate, necessary computing power and achievable voice or picture quality. It is desirable to choose for each data connection the optimum codec, which guarantees the best possible quality without exceeding the available data rate.

For selecting the codec to be used, different possibilities are known, for example from ITU Recommendation H.245 ("Control Protocol for Multimedia Communication", 1998) or IETF RFC 2327 ("SDP: Session Description Protocol", April 1998). It is their common feature that the terminals possess in each case a list of supported codecs, from which one codec is selected. One possibility of negotiating consists in offering the codecs to the distant end, one after the other, in the order of the list. The first coding method accepted by the distant end will be used. Another possibility consists in one terminal transmitting its list to the distant end and the latter selecting, through comparison of the lists, the first codec suggested by both devices. In both variants, however, the available network capacity between the terminals involved is not taken into account.

Another possibility consists in differentiating different address ranges and setting a preferred codec or a codec list for each range. This codec or codec list will then be used for negotiating. In this way, a better adaptation of the coding method to the capacity available in the network can be achieved, this requires, however, a considerable configuration expenditure, both for the first putting into service of the terminal and for each major change in the network architecture.

SUMMARY

It is, therefore, the object of the present invention to provide a selection method for a codec, which, with minimum configuration expenditure, allows to negotiate the coding method, taking into account the transmission capacity. This task is solved by the feature combinations of the independent patent claims. Further preferred embodiments are indicated in the dependent patent claims.

The method according to the invention is based on the fact that the codec list by means of which the codec is negotiated is determined, for a new connection, by means of a table in which for at least one destination address range the associated transmission capacity is indicated and that this table is automatically updated by measurements. The address range indicates for which distant end the associated table entry is valid. Preferably, the address range is represented by an address prefix and the number of significant digits. This notation is known in the state of the art and is used, for example, for IP addresses in Classless Inter-Domain Routing (CIDR). By transmission capacity, one understands the data rate at which the data can be transmitted to a terminal in the above-mentioned address range. This can be either the maximum or the available transmission capacity. In principle, it is also possible that a codec list contains one codec only.

Each table entry preferably contains, furthermore, a list of possible codecs which can be used for connections in the corresponding address range. Alternatively, depending on the transmission capacity determined, the codec list is determined from an additional allocation table. As a further alternative, the codecs supported by the terminal are listed together with the limit capacity which has to be available to use the associated codec. The codec list contains in that case the codecs whose limit capacity is below the measured capacity, the limit capacity being equal or higher than the data rate of the associated codec. The negotiation properly speaking of a codec from an existing list is, as mentioned above, part of the state of the art.

It is the advantage of the invention that the table is automatically updated through measurements. This takes place preferably while a connection exists. The measurement can be carried out, for example, by means of pairs or sequences of packets. Several data packets are sent by the distant end immediately one after the other and the transmission capacity of the connection is determined by means of the time intervals between their arrivals at the terminal. Consequently, each terminal determines the transmission capacity in its role as a receiver. If the capacity of the connection is asymmetrical, i.e. different in sending and in receiving direction, the terminal with the lower capacity in receiving direction has to put through the selection of a codec with a lower data rate when the codec to be used is negotiated.

Preferably, the measuring packets are sent at random moments in order to avoid periodical accumulation effects and to guarantee a reliable measurement. For example, the immediately preceding useful-data packets are used as measuring packets. Thus, the same packet is sent twice or more times directly one after another. A receiver supporting the method according to the invention can determine in this way the transmission capacity of the connection by means of the time interval between the packets. Terminals not supporting the method according to the invention will recognize such a packet as a duplicate and will discard it. In this way, it is guaranteed that such terminals will not be disturbed by the measuring packets. Alternatively, special packets can be used as measuring packets. Through varying packet sizes and additional contents, the measuring precision can be further enhanced. The above-mentioned measuring methods are known in the state of the art. Of course, other measuring methods can also be used. A survey of possible measuring methods is given, for example, in the article "Bandwidth Estimation: Metrics, Measurements Techniques and Tools" of Ravi Prasad et al., IEEE Network, Vol. 17, No. 6, November/December 2003, pages 27-35.

Advantageously, each table entry contains, in addition to the transmission capacity, a confidence interval indicating the range of transmission capacity within which the actual capacity lies with a specified probability. The smaller the confidence interval, the more precise the measurement of the transmission capacity.

In a further advantageous embodiment, each table entry contains in addition the measuring moment when the transmission capacity was last measured. This value can be used for management and administration of the table.

Advantageously, the table contains a default entry which is valid for all addresses. This entry can be used if no measured value is available yet for the address range in which the distant end lies.

For selecting the codec, preferably the table entry is used whose address range coincides to the largest extent with the address of the distant end. That means that out of the table entries within whose address range the address of the distant end lies, the one with the smallest address range will be selected. That means that the table entry with the address range matching in the most specific way will be searched. Alternatively, the most recent table entry within whose address range the address of the distant end lies will be used. A combination of address match and up-to-dateness of the measurement is also possible.

Advantageously, the codec can be changed while a connection exists. If, for example, a measurement shows that the transmission capacity has changed significantly in comparison with the table entry, it will be possible to change over to a codec with a higher or lower data rate, without interrupting the connection.

Advantageously, each selection of a codec for a connection is verified during the connection through measurements. The measurement either confirms the selection, in which case the table entry which had led to the selection of the codec will be updated with the results of the measurement. For example, the confidence interval can be reduced or the moment of measurement can be set to the moment of the last measurement. If the result of the measurement differs considerably from the entry which had been used for the selection, there will be two possibilities. Either the table can be updated by correcting one or more table entries, for example by changing the value of the transmission capacity or the confidence interval. Or the table can be updated by generating a new table entry. In the latter case, the address range will be divided, i.e. the range of validity of the table entry will be limited by generating a specific entry with a smaller address range.

It depends on various factors which of the two above-mentioned possibilities will be realized. These factors are, for example, overlapping of address range and address of the distant end or age and precision of the measurement in the table entry found. According to tendency, a correction will be carried out if the address of the distant end and the address range match well, the results of the measurement are relatively old and/or include a high uncertainty, i.e. a large confidence interval. New table entries will rather be generated if the address of the distant end belongs to a table entry with a large address range, the measurements in the table entry are relatively recent and/or certain. The question which possibility will be chosen in a concrete case is a question of optimization, which lies within the discretion of the person skilled in the art who implements the method.

Advantageously, the table can also be updated through clearing up. This means in particular the deletion of table entries which do not contain any significant information. These are, for example, entries whose last measurement was carried out a relatively long time ago or includes a relatively high uncertainty, i.e. shows a large confidence interval. An entry will also be deleted if there exists another entry with a larger address range which for a new connection with the distant end will select the same codec.

In a further embodiment of the invention, the result of a measurement is exchanged between the terminals involved. This can be effected, for example, through an RTCP (Real-Time Control Protocol). With this, asymmetries in the network can be ascertained if the terminals find out a difference in the transmission capacities for the same connection. With symmetrical conditions, the confidence interval can be reduced, as the exchange of the results of the measurements corresponds in this case to an increase of the number of measuring packets.

The method according to the invention is not only suited for selecting a codec for a connection between two terminals, but also for more complex communication relations. If, for example, a mixer for conference circuits is involved in the communication, said mixer will determine the capacities of the transmissions to the individual users. It will select either a codec supported by all users or the optimum codec for each individual connection. In this case, however, a conversion between the different codecs has to be effected in the mixer.

BRIEF DESCRIPTION OF THE SEVERAL VIEWS OF THE DRAWINGS

The invention will be explained in more detail by means of an embodiment example in which.

DETAILED DESCRIPTION

Figures 1, 2, 3, 4A, 4B:
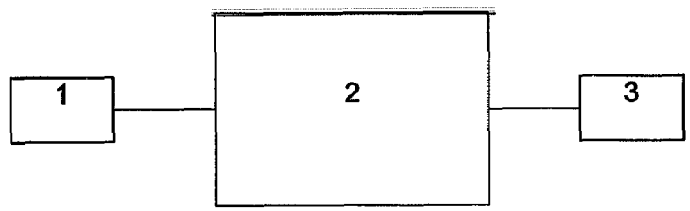
FIG. 1 shows two terminals connected through a network.
FIG. 2 is a table with transmission capacity and codec list.
FIG. 3 is a table with transmission capacity.
FIG. 4a is a table with codec list by capacity range.
FIG. 4b is a table with codecs and limit capacities.

The present embodiment example describes the selection of a codec for establishing a VoIP voice connection, but can easily be applied to any audio and/or video connection through packet switching networks.

FIG. 1 shows IP telephone 1 and 3 connected with each other through a network 2. In the following, the method taking place in IP telephone 1, referred to as terminal, will be described. Telephone 3 is referred to as distant end. Its address in network 2, the IP address, is also referred to as destination address.

According to a preferred first embodiment, the table shown in FIG. 2 is stored in terminal 1. It contains a default entry, which can be used for all destination addresses. From former measurements, three table entries exist, each containing, for a particular address range, the transmission capacity and the confidence interval in kilobytes per second, the moment of measurement, and a list of possible codecs. The moment of measurement is indicated in Unix time format, which counts the seconds which have passed since 1 Jan. 1970 at 0:00 a.m. This is particularly advantageous because in this way, two moments can be compared through one comparison of two integers. The codecs listed in the list, G.711, G.726 and G.729, represent voice codecs according to the state of the art with different data rates. Of course, the method according to the invention is not limited to the three codecs mentioned.

The addresses are IP addresses of a length of 32 bits, using the usual notation, in which the 4 bytes of the address are represented in decimal notation and separated by dots. After the address, separated by a slash, the number of significant digits, in this case, of significant bits, are indicated. Therefore, a table entry is valid for the address range in which the destination address shares the indicated number of bits with the address indicated in the table entry. In the example of the third table entry, these are the first 24 bits or 3 bytes, the address range comprising the addresses 192.168.67.0 to 192.168.67.255.

In a first example, the IP address of the distant end be 10.5.128.7. To select the codecs suitable for a voice connection with distant end 3, it is verified in terminal 1 whether an address range contained in a table entry comprises the destination address. The first byte of the destination address matches both the first and the second table entry. The number of significant bits of the second table entry is 20, but the second byte of the address defining the address range (decimal 243) does not coincide with the second byte of the destination address (decimal 5). Therefore, the second table entry is excluded from selection of the codec list.

It is true that the second byte of the address of the first entry (decimal 0) also differs from the second byte of the destination address, but only the first byte is significant, so that a match has been found. Thus, it is assumed for the connection between terminal 1 and distant end 3 that the mean transmission capacity is 879.2 kilobytes per second. For the connection, codecs G.726, G.711 and G.729 are suitable. The order of the codecs in the list expresses a preference for their selection. The question which of the three codecs will actually be used will be decided by the result of the negotiation method, which is known in the state of the art, as described before, and which will not be explained in detail here.

During the connection, the actual transmission capacity between terminal 1 and distant end 3 is measured. If it coincides with the capacity indicated in table entry one, the moment of the last measurement will be set as the moment of measurement in this entry. If the transmission capacity measured deviated only slightly from the transmission capacity indicated in the table entry, the values contained in the table entry will be adapted. In case of a larger deviation, a new table entry will be generated. In this way, the relative large address range of table entry one will be limited, as an additional table entry separately covers a subset of the address range. One possibility would consist in defining the address range through address 10.5.128.7 and to determine that the number of significant bits is 16. This determination is arbitrary in the present embodiment example and will in the actual implementation lie within the discretion of the person skilled in the art. The same applies to the codecs to be included in the codec list and to their order within the list.

In a second example, the destination address be 135.9.128.7. There is no specific table entry in whose address range the destination address would fall. Therefore, for negotiating the codec, the default entry will be used, according to which codecs G.711, G.726 and G.729 are available.

While the voice connection between terminal 1 and distant end 3 exists, the distant end 3 will at random moments send data packets twice. From the time interval with which the data packets sent twice arrive at terminal 1, the latter determines in a way known to the person skilled in the art the transmission capacity and the confidence interval of the connection. Based on these measured values and the moment of measurement, a new table entry will be generated, which is valid for the address range within which the destination address lies. The determination of the size of this address range as well as of the codec list lies within the discretion of the person skilled in the art who implements the method and can, for example, be made contingent on the other table entries. Alternatively to doubling the useful-date packets, it is possible to determine the transmission capacity and the confidence interval by means of specific measuring packets. It is, however, the advantage of doubling the useful-data packets that a terminal not supporting the method according to the invention, will discard the double packets and will, therefore, not be disturbed.

In the second and third embodiments, terminal 1 contains the table shown in FIG. 3, in which, in addition to the address range, the transmission capacity, the confidence interval, and the moment of measurement are stored. Contrary to the first variant, there is no codec list, the latter is taken from tables 4a and 4b, respectively. For this purpose, first of all, the transmission capacity of the best matching table entry is determined from the table of FIG. 3. This is done analogously to the preceding example. For IP address 10.5.128.7, the first table entry is chosen and, thus, a transmission capacity of 879.2 kilobits per second is determined. For IP address 135.9.128.7, the last table entry is chosen and, thus, a transmission capacity of 10000.0 kilobits per second is determined.

According to the second embodiment, it will then be searched in the table of FIG. 4a for the entry within whose capacity range the determined transmission capacity lies. Through the table of FIG. 4a, a list of codecs, which is used for the negotiation properly speaking, is allocated to this capacity range. For IP address 10.5.128.7, the transmission capacity of 879.2 kb/s lies within the capacity range of 500 kb/s to 2000 kb/s, leading to a list with the codecs G.726, G.711 and G.729. For IP address 135.9.128.7, the transmission capacity of 10000.0 kb/s falls within the capacity range of 2000 kb/s to 15000 kb/s, leading to a list with the codecs G.711, G.726 and G.729.

According to the third embodiment, the list of codecs is generated by means of the table of FIG. 4b. For this purpose, all codecs whose allocated limit capacity is smaller than, or equal to, the transmission capacity determined by means of the table of FIG. 3, are included in the list. The list is preferably sorted by descending limit capacity of the codecs, so that the codec with the highest possible rate will be used. For IP address 10.5.128.7, the transmission capacity of 879.2 kb/s was determined, so that only codec G.729 is suitable. For IP address 135.9.128.7, the transmission capacity of 10000.0 kb/s was determined, so that the list with the codecs G.711, G.726 and G.729 is generated.

In embodiments 2 and 3, the transmission capacity is also measured and a new table entry is generated for an address range, within which the destination address 135.9.128.7 lies. Regarding the layout of the address range, the explanations given for embodiment 1 apply, a separate codec list will, however, not be stored in these cases.

It is obvious that the first embodiment offers the highest degree of flexibility because in each table entry, an independent codec list can be provided. The second embodiment is restricted in that for connections for which the same transmission capacity was determined, always the same codec list will be determined, independently of the address range. Through the granularity of the entries in the table of FIG. 4a, however, a subdivision of any desired fineness can be achieved by means of the transmission capacity, by storing further entries. For example, the entry with the capacity range of 500 kb/s to 2000 kb/s could be restricted to the range of 1000 kb/s to 2000 kb/s and a new entry with the range of 500 kb/s to 1000 kb/s and the codec list G.726, G.729, G.711 could be generated, with the consequence that for connections with a transmission capacity in this range, codec G.729 will move to the second place of the list and, therefore, a low-rate codec will rather be used.

It is a further advantage of the method according to the invention that in principle, it will be sufficient that only one terminal supports the method. If, for example, distant end 3 does not support the method, terminal 1 can, nevertheless, determine the transmission capacity and, thus, the codec list, by means of the address of distant end 3. In this case, an updating of the table is, however, not possible, as distant end 3 will send neither doubled useful-data packet nor dedicated measuring packets for determining the transmission capacity.

The above embodiment examples are purely exemplary and, therefore, not limiting. For example, more or other codecs than the three codecs mentioned can be used. Furthermore, the method according to the invention is in principle suitable for any type of codec, i.e. voice codecs, video codecs or a combination of both. The transmission capacity can also be measured by means of measuring methods other than those concretely proposed, and it is not generally obligatory to use a confidence interval. The method proposed is suitable for each packet switching connection. When searching a table entry for a destination address, the entry need not coincide exactly with the address range, in particular in case of a large number of significant digits, a partial match can also be considered as a hit.

The invention claimed is:

1. A method for selecting a codec, comprising:
   a terminal determining a codec list for a new packet-switched connection between terminals using a table in which a transmission capacity associated with a destination address range is indicated for at least one destination address, wherein the terminal selects the codec from the codec list, wherein the codec transmits at least one of audio and video data between at least two terminals through the new packet-switched connection;
   the terminal measuring transmission capacities associated with the destination address range;
   the terminal automatically updating the table by creating table entries based on the transmission capacity measurements, wherein the table entries include a confidence interval associated with a confidence in one of the transmission capacity measurements; and
   the terminal providing the updated table for subsequent packet switched connections.

2. The method according to claim 1, wherein a sequence of codecs in the codec list expresses a preference for a selection of codec.

3. The method according to claim 1, wherein at least one transmission capacity measurement is effected while a connection exists between two terminals.

4. The method according to claim 1, wherein at least one transmission capacity measurement is effected by means of pairs or sequences of packets.

5. The method according to claim 1, wherein the table contains a default entry, which is valid for all destination addresses.

6. The method according to claim 1, wherein each table entry additionally contains a codec list.

7. The method according to claim 1, wherein each table entry additionally contains a time of measurement.

8. The method according to claim 1, wherein, for selecting the codec, a table entry is used whose address range coincides to a largest extent with an address of a distant end.

9. The method according to claim 1, wherein the codec is changed while a data connection exists.

10. The method according to claim 1, wherein the table is updated through correction of one or several table entries.

11. The method according to claim 1, wherein the table is updated through clearing up the table.

12. The method according to claim 1, wherein a packet-oriented connection is a VoIP (Voice over IP) connection.

13. The method according to claim 1, wherein a result of a measurement is exchanged between terminals associated with the destination address range.

14. The method according to claim 1, wherein the confidence interval is based on a time when the transmission capacity measurement was made.

15. A terminal, comprising:
    a table data structure stored at the terminal in which, for at least one destination address range, an associated transmission capacity is indicated;
    a module operable to:
      determine, from the table, a codec list for a new packet-switched connection between the terminal and another terminal;
      measure transmission capacities for the new packet-switched connection between the terminal and the another terminal;
      automatically update the table by creating table entries based on the transmission capacity measurements, wherein the table entries include a confidence interval associated with a confidence in one of the transmission capacity measurements; and
      provide the updated table for subsequent packet switched connections.

16. The terminal of claim 15, wherein a sequence of codecs in the codec list expresses a preference for a selection and wherein at least one transmission capacity measurement is effected while a connection exists.

17. The terminal of claim 15, wherein at least one transmission capacity measurement is effected by means of pairs or sequences of packets, wherein the table contains a default entry, which is valid for all addresses, and wherein each table entry additionally contains a codec list.

18. The terminal of claim 15, wherein each table entry additionally contains a time of measurement, wherein, for selecting the codec, the table entry is used whose address range coincides to a largest extent with an address of a distant end wherein the codec can be changed while a data connection exists, and wherein the table is updated through correction of one or several table entries.

19. The terminal of claim 15, wherein the table is updated through clearing up the table, wherein a packet-oriented connection is a VoIP (Voice over IP) connection, and wherein a result of a measurement is exchanged between the terminal and the another terminal.

20. The terminal of claim 15, wherein the confidence interval is based on a time when the transmission capacity measurement was made.

* * * * *